United States Patent [19]

Fisher et al.

[11] 3,751,803

[45] Aug. 14, 1973

[54] METHOD OF MAKING A MAGNETIC HEAD

[75] Inventors: Robert D. Fisher, Woodstock; George C. Puram, Saugerties, both of N.Y.

[73] Assignee: Ferroxcube Corporation, New York, N.Y.

[22] Filed: May 16, 1972

[21] Appl. No.: 253,796

[52] U.S. Cl. .............................. 29/603, 179/100.2 C

[51] Int. Cl. .............................................. G11b 5/42

[58] Field of Search ................ 29/603; 179/100.2 C; 346/74 MC; 340/174.1 F

[56] References Cited

UNITED STATES PATENTS

| | | | |
|---|---|---|---|
| 3,605,258 | 9/1971 | Fisher et al. | 29/603 |
| 3,117,367 | 1/1964 | Duinker et al. | 29/603 |
| 3,624,897 | 12/1971 | Reade et al. | 29/603 |
| 3,688,056 | 8/1972 | Wisely et al. | 29/603 X |

*Primary Examiner*—Charles W. Lanham
*Assistant Examiner*—Carl E. Hall
*Attorney*—Frank R. Trifari

[57] ABSTRACT

A recording head and a method of manufacturing a recording head wherein capillary techniques are employable for gap formation without compression by means of a pre-bonded head structure. By use of sputtering techniques, the correct gap length can be set into the recording head.

12 Claims, 5 Drawing Figures

METHOD OF MAKING A MAGNETIC HEAD

This invention relates to a method of manufacturing micro gap magnetic transducing heads and more particularly, to a method of manufacturing glass bonded micro gap pole pieces used in the assembly of high frequency recording and/or reproducing heads.

The manufacture of high frequency transducing heads for use in video or digital recording or reproducing is dependent to a large degree, upon the extent to which a small operating gap, usable for reading or recording, is obtainable. It is understood that the term operating gap refers to that used in a transducing operation, such as reading or recording.

Conventional heads employing glass as a filler material for gaps have been proven advantageous in that glass has been found to provide relatively small gap spaces of the order of a few microns. Glass has further advantages in that it serves to bond together the gap facing pole pieces, and additionally possesses a wear characteristic which approximates that of the mating pole pieces. The pole pieces are commonly constructed of a polycrystalline ferrimagnetic material which is preformed, sintered and machined into a desired shape. Monocrystalline ferrite materials can also be employed for magnetic heads and these materials can be formed by conventional crystal growing techniques such as flame fusion or the like.

Conventional fabrication of glass bonded heads involves the steps of producing suitable ferrite materials, machining and lapping such materials to form suitable bars which are assembled by glass bonding and then diced and lapped to form the final head pole pieces.

The glass bonding step is crucial in the head assembly in establishing the gap length. A conventional glass bonding method involves the placement of thin fragments of glass, such as a foil or sheet, between the adjoining pole pieces, heating the assembly to the softening point of the glass, applying pressure to the glass to facilitate spreading and allowing the surfaces to cool and the glass to solidify and bond. This method has the disadvantage that complete and uniform coverage of glass is difficult to obtain and that the gap length obtainable is still relatively large for the desired high frequency recording.

In an alternative and more desirable method, capillary action is employed. Here, the pole pieces are preformed and placed adjoining one another along the gap faces by the use of shims of desired height. The pieces include a groove or the like adjoining the gap faces and a glass rod is placed in the groove. The assembly is then subjected to suitable pressure and temperature at which point the glass melts and, by capillary action, is drawn into the gap spacing between the pole pieces. The assembly is cooled, allowing the glass to solidify and bond the pole pieces, and then the area of the assembly containing the shims and groove is cut away. The remaining assembly can then be further diced and machined to form pole pieces of desired shape. This method has the advantage of providing a better coverage of glass, with greater uniformity, over the entire gap face, but suffers from the serious disadvantages of relatively low yield and gap length limitations. Furthermore, the use of shims to define gap length is difficult due to the rather precise tolerance required of the shims, and the manufacture of shims for extremely small gaps in the micro inch range is a very difficult operation.

Typical shimming techniques are accomplished by use of such expedients as a mechanical shim of nickel or the like, a sputter-deposited shim of stainless steel, glass, or the like, or a vacuum evaporated shim such as SiO, $SiO_2$, or $Al_2O_3$. As described above, application of suitable temperature and pressure results in the melting of the glass rod and by capillary action, the glass flows into the gap set up by the aforementioned shims. The disadvantage of the foregoing shimming technique is that each require some mode or means of applying a compression to the mating pole pieces to insure intimate contact between shimmed surfaces, or between the shimmed surface and the mating surface of the bar during the period when the glass is in its softened condition.

During the compression stage, extreme care must be exercised to continually insure mating contact and to prevent lateral shift which may destroy the gap alignment.

It is, therefore, the object of this invention to provide an improved, novel and unique method of manufacturing a glass bonded recording head which permits the elimination of the requirement of a compression system during glass bonding of the bars.

In order to accomplish this objective MnZn $Fe_2O_4$ or $N_1ZnFe_2O_4$ or their constituents are sputtered onto appropriate surfaces of machined bars to the desired gap length. The linear ferrite or constituents are bonded to a mating bar of $MnZnFe_2O_4$ or NiZn $Fe_2O_4$ at a suitable sintering temperature with a small amount of pressure of the order of 200 psi. The bonding temperature and atmosphere is dependent upon the type of ferrite. The bonding of identical ferrite materials provides a strong bond and/or a magnetic back gap for subsequent pole piece fabriction plus provides a shim with identical thermal expansion characteristics. The glass rods are then inserted into the bonded bar assembly. Application of a suitable temperature 100° C to 200° C above the glass softening points allows the glass to flow, by capillary action, into the gap provided by the bonded $MnZnFe_2O_4$ or NiZn $Fe_2O_4$ shims. No pressure is then required as in the conventional systems where as previously stated pressure is applied to insure mating of the respective shim surfaces.

The foregoing brief description as well as other objects, advantages and further features will become more apparent from the following description and appended drawings wherein.

Figure 1:
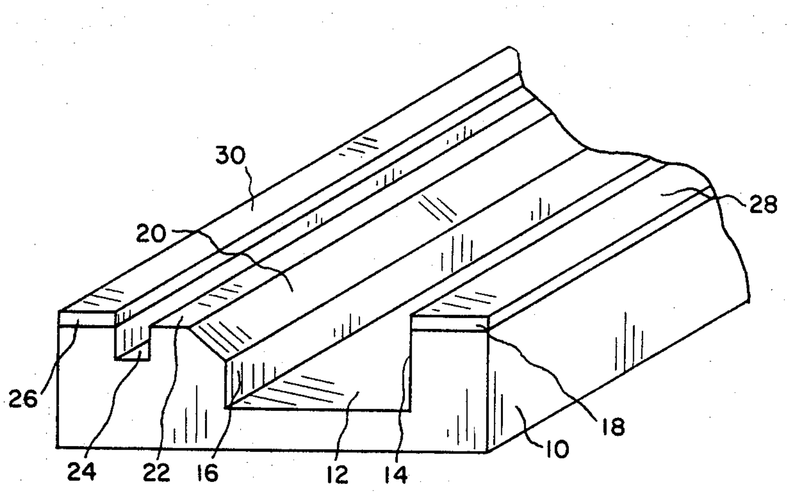
FIG. 1 illustrates the initial bar assembly.

Referring now to FIG. 1, a first pole piece 10 is constructed and machined into the bar shape shown. It is understood that the term pole piece refers to the bar in its unfinished as well as its finished state and is merely a reference to its ultimate function. The bar 10 includes a first channel 12 formed between a side wall 14 and a side wall 16. The side wall 14 terminates in a top portion 18 which will form a first mating surface. The side wall 16 terminates in a bevel area 20 which in turn joins with the gap mating surface 22. On the far side of the surface 22 is a second channel 24 which forms the far side of the gap height defined by the surface 22. The channel 24 includes a top portion 26. The pole piece can be composed of a suitable composition material such as a nickel zinc ferrite, a manganese zinc ferrite, or a like material.

Next, the pole piece is placed in a sputtering chamber, and shimming material 28 and 30 is sputtered onto the top end surfaces 26 and 18. The material can be any suitable material capable of bonding to the pole piece, and preferably of the same composition as the ferrite, such as a manganese zinc ferrite or a nickel zinc ferrite. The sputtering operation is conventional, and a full description of such a conventional sputtering technique may be found in U.S. Pat. No. 3,605,258. The shimming material is sputtered to the end surfaces 26 and 18 to a depth corresponding to the ultimate gap length desired. If the pole piece 10 was machined such that the surfaces 18, 22 and 26 was coplanar then the shimming material is sputtered on to the end surfaces 18 and 26 to a depth equalling that of the desired gap length.

Figure 2:
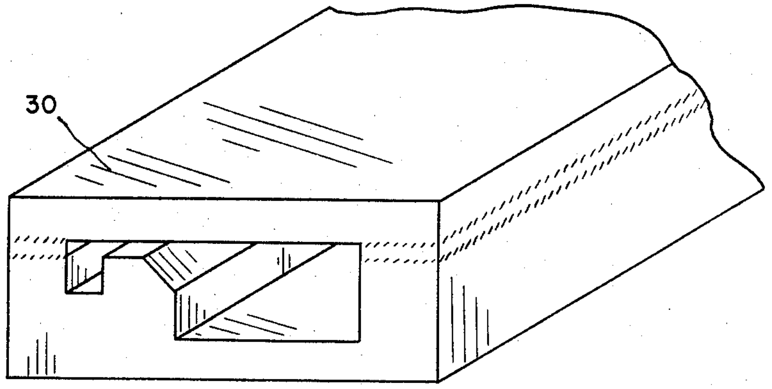
FIG. 2 shows a bonded bar configuration.

Next, mating piece 30 is set upon the sputtered surface as shown in FIG. 2. The mating piece will have the same composition as the pole piece. The assembly is then placed in a suitable heating furnace and heated to a sintering temperature with a small amount of pressure to provide a bond. The bonding temperature and atmosphere is dependent on the type of ferrite employed in the pole piece. For example, for a nickel zinc ferrite, the bonding temperature is of the order of 1,200° C in an air atmosphere for a time period in the range of from 5 to 15 minutes, preferably 10 minutes. In the case of a manganese zinc ferrite, the bonding temperature is 1,300° C in an inert atmosphere for a time period in the range of between 5 to 15 minutes, again preferably 10 minutes. The bonding of identical ferrite materials provides a strong bond and, in the configuration shown, a magnetic back gap. Also, the use of identical materials results in a shim with identical thermal expansion characteristics relative to the pole piece.

Figure 3:
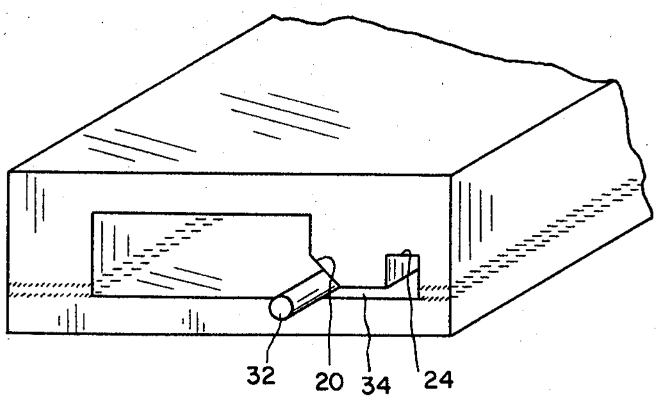
FIG. 3 illustrates the manner of placement of the glass rod.

The bonded assembly is now ready for the gap material. The capillary process is employed as shown in FIG. 3, the bonded assembly is placed with a glass rod 32 inserted alongside the bevel surface 20 next to the gap 34. The assembly is then heated to slightly above the softening point of the glass rod, i.e., to about 100° C to 200° C above the softening point of the glass in an air atmosphere for $N_iZn$ ferrites and an inert atmosphere for MnZn ferrites allowing the glass to flow into the recording gap. The spacing of the gap is fixed by virtue of the bonded shims. Since the shims not only fix the spacing, but provide sufficient strength to hold the gap spacing position, the need for compression, during the glass bonding process, is eliminated. The channel area 24 provides sufficient air escape to allow the glass to flow evenly across the gap area 34 as well as space for overflow if necessary. After the flow step is completed, the assembly is cooled to solidify the glass fillet 36 in position.

Figure 4:
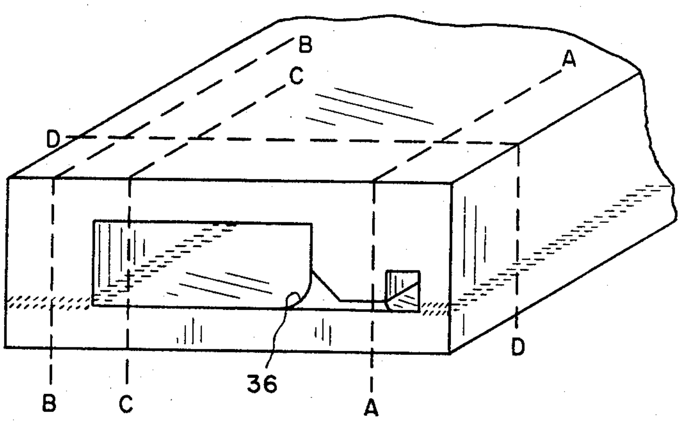
FIG. 4 shows the bonded bar prior to cutting and dicing into pole pieces.

The assembly can then be diced and machined as desired to form the bonded pole piece pairs from which the ultimate recording head can be made. As shown in FIG. 4, the assembly can be cut along lines A — A to provide a glass bonded face assembly. If a closed ended head is desired, a cut is made along lines B — B. If an open ended head is desired, a cut is made along lines C — C. Appropriate electrical windings, arm assemblies, frames, etc. can be provided to complete the head assembly.

Finally, a plurality of bonded pole-piece pairs can be provided by a series of lateral parallel cuts along lines D — D.

Typically, gap depth and shim thicknesses can be of the order of 60 microinches, although clearly other sizes are possible.

Figure 5:
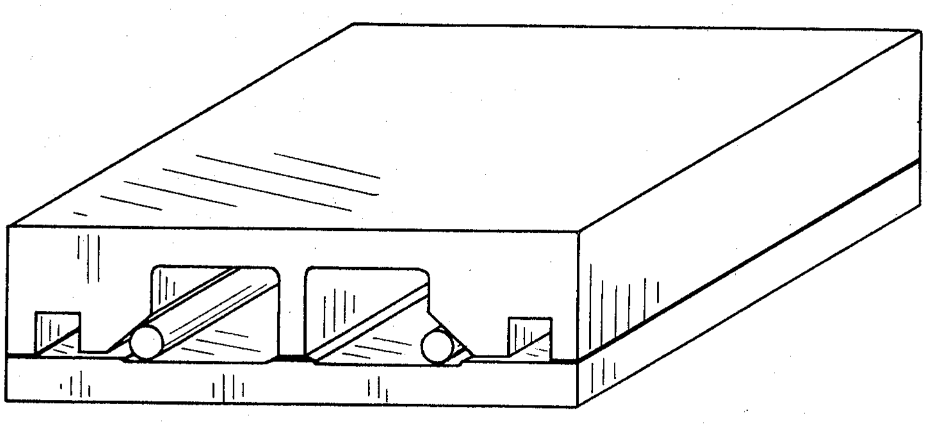
FIG. 5 shows a dual pole piece assembly.

As an alternative, a dual assembly is shown in FIG. 5. The dual assembly can be manufactured in accordance with the same procedure set forth above, with only the additional machining steps necessary for making the upper bar, as shown, in a manner which permits the mass production of the recording heads in the desired configuration.

While the invention has been described and shown with reference to certain preferred embodiments thereof, it will be understood by those skilled in the art that the foregoing and other changes in form and details may be made therein without departing from the spirit and scope of the invention.

What is claimed is:

1. A method of manufacturing a bonded head assembly having an operative gap of predetermined depth comprising the steps of machining a first piece of magnetic material to form at least first and second channels therein, said channels being bounded by first, second and third raised areas with first, second and third planar surfaces, respectively, placing first and second shims onto said first and third surfaces, placing a mating piece of magnetic material across said first, second and third areas, said shims having a thickness such that said second surface is spaced from said mating piece by the desired gap depth, bonding said shims to said first piece and said mating piece, then filling said spacing between said second surface and said mating piece with a non-magnetic material, bonding said non-magnetic material to said second surface and said mating piece, and removing from said assembly said second channel portion.

2. The combination of claim 1 wherein said first channel is machined larger than said second channel.

3. The combination of claim 1 wherein said first, second and third surfaces are co-planar.

4. The combination of claim 1 wherein said shims are of a thickness equal to said predetermined gap depth.

5. The combination of claim 1 wherein said shims are sputtered onto said first piece.

6. The combination of claim 1 wherein said shims are of the same composition as said first piece and said mating piece, and said placing includes the steps of sputtering said shims onto said first piece, and said bonding includes the step of sintering said mating piece to said shim.

7. The combination of claim 1 wherein said non-magnetic filler is provided by placing a glass rod adjacent said second area in one of said channels, heating said assembly until said glass rod softens and is drawn into the gap between said second surface and said mating piece by capillary action, and cooling said assembly until said glass hardens into position.

8. The method of claim 1 wherein said assembly is diced across said channels to form a plurality of bonded pole piece pairs.

9. A method of manufacturing a pole piece pair for a bonded head assembly, said bonded pole piece pair having an operative gap of predetermined depth, comprising the steps of machining a first piece of ferrite to form a plurality of channels bounded by raised areas with planar surfaces, placing shims of the same composition as said first piece on the surfaces of at least two alternate raised areas, placing a mating piece of the same composition as said first piece across said channels upon said shims, sintering the assembly to form a unitary structure, said mating piece separated from each raised non-shimmed area by a depth of said shim equal to said predetermined depth to form the ultimately desired operative gap, then placing a glass rod adjacent each operative gap in an adjacent channel, heating said assembly until said glass rod softens and is drawn into said gap by capillary action, cooling said assembly until said glass hardens in position, cutting said unitary structure along each gap to form a plurality of glass bonded face assemblies, and cutting each glass bonded face assembly laterally to form a plurality of bonded pole piece pairs.

10. The combination of claim 9 wherein said shims are sputtered onto said first piece.

11. The combination of claim 9 wherein said ferrite is a manganese zinc composition.

12. The combination of claim 9 wherein said ferrite is a nickel zinc composition.

* * * * *